(12) United States Patent
Kondo et al.

(10) Patent No.: US 6,782,084 B2
(45) Date of Patent: Aug. 24, 2004

(54) SPECIAL CALL FEE CHARGING METHOD

(75) Inventors: Takayuki Kondo, Tokyo (JP); Eiji Kito, Tokyo (JP)

(73) Assignee: NEC Corporation, Tokyo (JP)

( * ) Notice: Subject to any disclaimer, the term of this patent is extended or adjusted under 35 U.S.C. 154(b) by 577 days.

(21) Appl. No.: 09/799,556

(22) Filed: Mar. 7, 2001

(65) Prior Publication Data

US 2001/0021647 A1 Sep. 13, 2001

(30) Foreign Application Priority Data

Mar. 13, 2000 (JP) ........................................ 2000-069365

(51) Int. Cl.[7] ............................................ H04M 15/00
(52) U.S. Cl. .............. 379/126; 379/127.01; 379/121.01; 379/114.1
(58) Field of Search ...................... 379/114.01, 114.19, 379/114.2, 114.13, 114.21, 114.22, 114.23, 114.1, 114.12, 114.26, 127.01, 127.03, 126, 125, 121.01, 121.02, 120; 455/405, 406, 408

(56) References Cited

U.S. PATENT DOCUMENTS

| | | | | |
|---|---|---|---|---|
| 5,473,671 A | * | 12/1995 | Partridge, III | 379/142.01 |
| 6,259,779 B1 | * | 7/2001 | Council et al. | 379/121 |
| 6,353,663 B1 | * | 3/2002 | Stevens et al. | 379/114.22 |
| 6,650,742 B1 | * | 11/2003 | Elliott et al. | 379/114.22 |

FOREIGN PATENT DOCUMENTS

| | | |
|---|---|---|
| GB | 873147 | 7/1961 |
| JP | 63-299453 A | 12/1988 |
| JP | 08-130579 A | 5/1996 |
| JP | 10-32655 A | 2/1998 |
| JP | 11-17844 A | 1/1999 |
| JP | 11-41380 A | 2/1999 |
| JP | 11-341183 A | 12/1999 |
| WO | WO 00/10318 A1 | 2/2000 |

* cited by examiner

*Primary Examiner*—Rexford Barnie
(74) *Attorney, Agent, or Firm*—Sughrue Mion, PLLC (57) ABSTRACT

A special call fee charging method is disclosed, that comprises the steps of (a) causing an exchange device to receive a call origination signal from a call origination subscriber terminal unit; (b) causing the exchange device to inquire of a special charging server whether or not the call origination subscriber terminal unit is a specially charged subscriber terminal unit; (c) causing the special charging server to reply to the exchange device whether or not the call origination subscriber terminal unit is a specially charged subscriber terminal unit; and (d) if the call origination terminal unit is a specially charged call terminal unit as the result at step (c), causing the exchange device to notify a general charging server that the call origination subscriber terminal unit is charged a special call fee.

5 Claims, 6 Drawing Sheets

SPECIAL CALL FEE CHARGING METHOD

BACKGROUND OF THE INVENTION

1. Field of the Invention

The present invention relates to a special call fee charging method, and in particular, to a special call fee charging method that allows both a call origination subscriber and a call termination subscriber to have their advantages.

2. Description of the Prior Art

As market competitions are becoming severe, individual competitors are seeking various their survival measures. In particular, those companies are intensively attempting to get their customers. Examples of means for getting customers are direct mail, hanging advertisement in buses and trains, commercial message in TV and radio, and so forth. Among them, a sales telephone call is especially effective to explain a particular product to a prospect and to stimulate his or her purchase desire.

However, before a sales person of a company or the like as a call origination subscriber performs a sales talk to a prospect, the prospect mostly tends to disconnect the call. Thus, to get a customer, the sales person should make many telephone calls. However, even if the prospects disconnect the telephone calls before the sales person explains the sales product to them, the sales person as a call origination subscriber is charged for the telephone calls.

On the other hand, although the prospects as call termination subscribers are not charged for the telephone calls, they spend their valuable time. Thus, the prospects may ask the sales person for compensation for their valuable time.

SUMMARY OF THE INVENTION

The present invention is made from the above-described point of view. An object of the present invention is to provide a special call fee charging method that allows a call origination subscriber and a call termination subscriber to have their advantages.

According to a first aspect of the present invention, there is provided a special call fee charging method, comprising the steps of: (a) causing an exchange device to receive a call origination signal from a call origination subscriber terminal unit; (b) causing the exchange device to inquire of a special charging server whether or not the call origination subscriber terminal unit is a specially charged subscriber terminal unit; (c) causing the special charging server to reply to the exchange device whether or not the call origination subscriber terminal unit is a specially charged subscriber terminal unit; and (d) if the call origination terminal unit is a specially charged call terminal unit as the result at step (c), causing the exchange device to notify a general charging server that the call origination subscriber terminal unit is charged a special call fee.

The method according to the first aspect may further comprise the steps of: causing the exchange device to inquire of the special charging server about a charging period; causing the special charging server to notify the exchange device of the charging period; and causing the exchange device to send a charging request to the general charging server whenever the charging period elapses in a talk.

The method according to the first aspect may further comprise the step of: causing the special charging server to register a telephone number of a subscriber terminal unit as a non-specially charged subscriber terminal unit with a table, wherein if the telephone number of the call origination subscriber terminal unit has not been registered with the table, the special charging server determines that the call origination subscriber terminal unit is a specially charged subscriber terminal unit.

The method according to the first aspect may further comprise the step of: paying a part or all of the margin between the special call fee and a regular call fee to a call receiver.

According to a second aspect of the present invention, there is provided a special call fee charging method, comprising the steps of: (a) causing an exchange device to receive a call origination signal from a call origination subscriber terminal unit, the call origination signal containing a special charging request; (b) causing the exchange device to notify a charging server that the call origination subscriber terminal unit is charged a special call fee; (c) causing the exchange device to inquire of the charging server about a charging period; (d) causing the charging server to notify the exchange device of the charging period; and (e) causing the exchange device to send a charging request to the charging server whenever the charging period elapses in a talk.

The method according to the second aspect may further comprise the step of: paying a part or all of the margin between the special call fee and a regular call fee to a call receiver.

These and other objects, features and advantages of the present invention will become more apparent in light of the following detailed description of a best mode embodiment thereof, as illustrated in the accompanying drawings.

DESCRIPTION OF PREFERRED EMBODIMENTS (First Embodiment)

Figure 1:
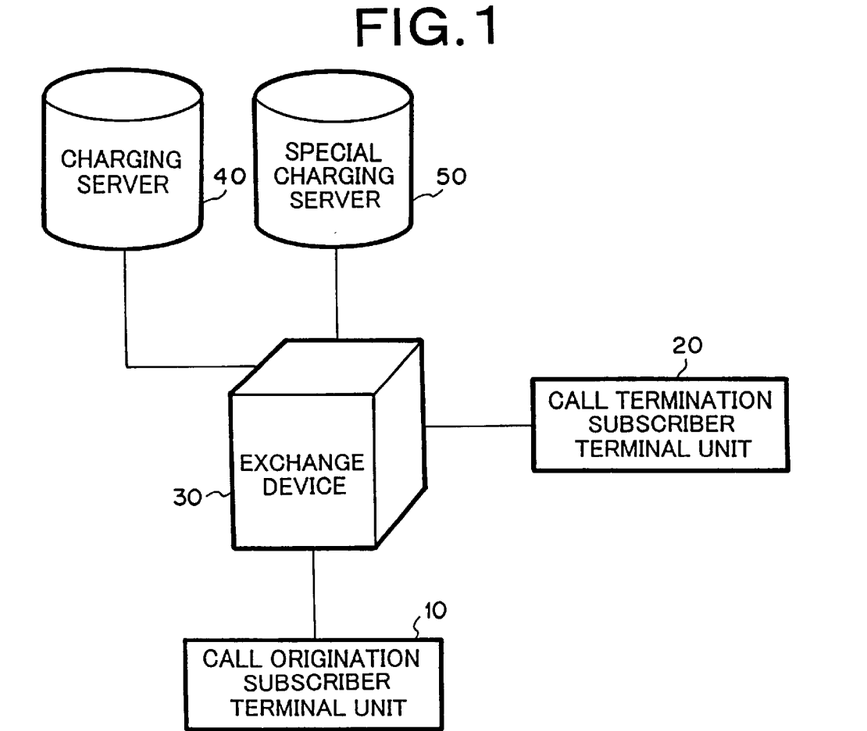
FIG. 1 is a block diagram for explaining the structure of a call fee charging system according to the present invention.

Next, with reference to the accompanying drawings, a special call fee charging method according to a first embodiment of the present invention will be described. FIG. 1 is a block diagram showing the structure of the call fee charging system according to the first embodiment of the present invention.

In the call fee charging system shown in FIG. 1, information is exchanged between a call origination subscriber terminal unit 10 and a call termination subscriber terminal unit 20 through an exchange device 30. The call origination subscriber terminal unit 10 and the exchange device 30 may be connected wirelessly or through a cable. Likewise, the call termination subscriber terminal unit 20 and the exchange device 30 may be connected wirelessly or through a cable. The call origination subscriber terminal unit 10 and the call termination subscriber terminal unit 20 are for example mobile portable terminal units (so-called portable telephone units).

The exchange device 30 is connected to a charging server 40 and a special charging server 50. The exchange device 30 exchanges charging information about call fees with the charging server 40. On the other hand, the exchange device 30 exchanges charging information about special call fees with the special charging server 50. The special charging server 50 is a means for determining whether the current call is a regular fee call or a special fee call. The charging server 40 and the special charging server 50 may be structured as a single structural portion.

Figure 2:
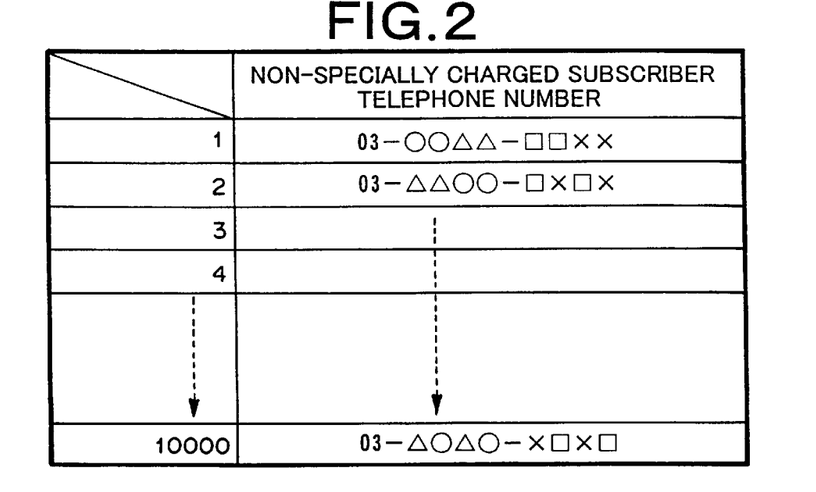
FIG. 2 is a schematic diagram for explaining an example of a non-specially charged subscriber table stored in a special charging server shown in FIG. 1.

Next, the operation of the call fee charging system according to the first embodiment will be described. A call termination subscriber should register the telephone number of a non-specially charged subscriber terminal unit (namely, a regularly charged subscriber terminal unit). The specially charged subscriber terminal unit is charged a higher call fee than a regular call fee. For example, when a regular call fee is ¥10 every three minutes, a special call fee is for example ¥30 every three minutes. The telephone number of the non-specially charged subscriber terminal unit is registered with a non-specially charged subscriber table stored in the special charging server 50. FIG. 2 is a schematic diagram for explaining an example of such a non-specially charged subscriber table.

The telephone number of the non-specially charged subscriber terminal unit can be registered with the non-specially charged subscriber table any time (before a call is terminated, when a call is terminated, while a talk is being performed, or after a talk is over). Likewise, the telephone number of the non-specially charged subscriber terminal unit can be deleted from the non-specially charged subscriber table any time. Next, the registration operation and the deletion operation of the non-specially charged subscriber terminal unit will be described.

Figure 3:
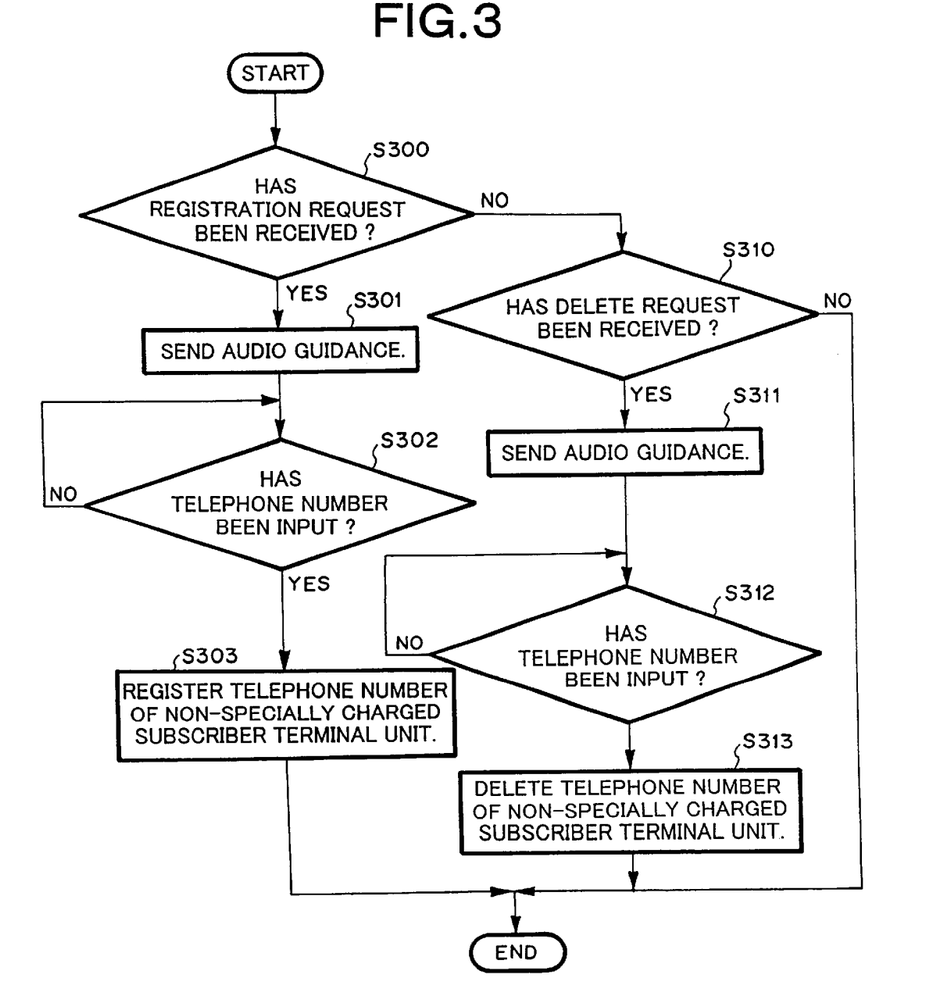
FIG. 3 is a flow chart for explaining a registration operation and a deletion operation for a non-specially charged subscriber.

First of all, the registration operation and the deletion operation that are performed before a call is terminated will be described. FIG. 3 is a flow chart for explaining the registration operation and the deletion operation that are performed before a call is terminated. To send a registration request, the call termination subscriber dials a predetermined telephone number (for example, O∆O) on the call termination subscriber terminal unit 20. At that point, the exchange device 30 determines that the registration request for the telephone number of the non-specially charged subscriber terminal unit has been received (at step S300).

When the registration request has been received (namely, the determined result at step S300 is Yes), the exchange device 30 sends an audio guidance such as "Please input the telephone number of the non-specially charged subscriber terminal unit...." to the call termination subscriber through the call termination subscriber terminal unit 20 (at step S301). Alternatively, the exchange device 30 may causes such an audio guidance to be displayed on a display panel or the like of the call termination subscriber terminal unit 20. Thereafter, the call termination subscriber performs a dial operation for the telephone number (for example, 03-OO∆∆-OOXX)) of the non-specially charged subscriber terminal unit on the call termination subscriber terminal unit 20.

Thereafter, the exchange device 30 determines whether or not the telephone number of the non-specially charged subscriber terminal unit has been input (at step S302). When the telephone number has not been input (namely, the determined result at step S302 is No), the exchange device 30 waits until the telephone number has been input. In contrast, when the telephone number has been input (namely, the determined result at step S302 is Yes), the exchange device 30 registers the telephone number of the non-specially charged subscriber terminal unit with the non-specially charged subscriber table (at step S303).

When the exchange device 30 has recognized that the registration request has been received (namely, the determined result at step S300 is No), the exchange device 30 determines whether or not a deletion request for the telephone number of the non-specially charged subscriber terminal unit has been received (at step S310). Likewise, to send the deletion request, the call termination subscriber performs a dial operation for a predetermined number (for example, XXO) on the call termination subscriber terminal unit 20. When the exchange device 30 has received the deletion request, the exchange device 30 sends a predetermined audio guidance to the call termination subscriber through the call termination subscriber terminal unit 20 in the same manner as the registration operation (at step S311).

Thereafter, the exchange device 30 determines whether or not the telephone number (to be deleted) of the non-specially charged subscriber terminal unit has been input (at step S312). When the telephone number has not been input (namely, the determined result at step S312 is No), the exchange device 30 waits until the telephone number has been input (at step S312). When the telephone number has been input (namely, the determined result at step S312 is Yes), the exchange device 30 deletes the telephone number of the non-specially charged subscriber terminal unit from the non-specially charged subscriber table (at step S313).

Figure 4:
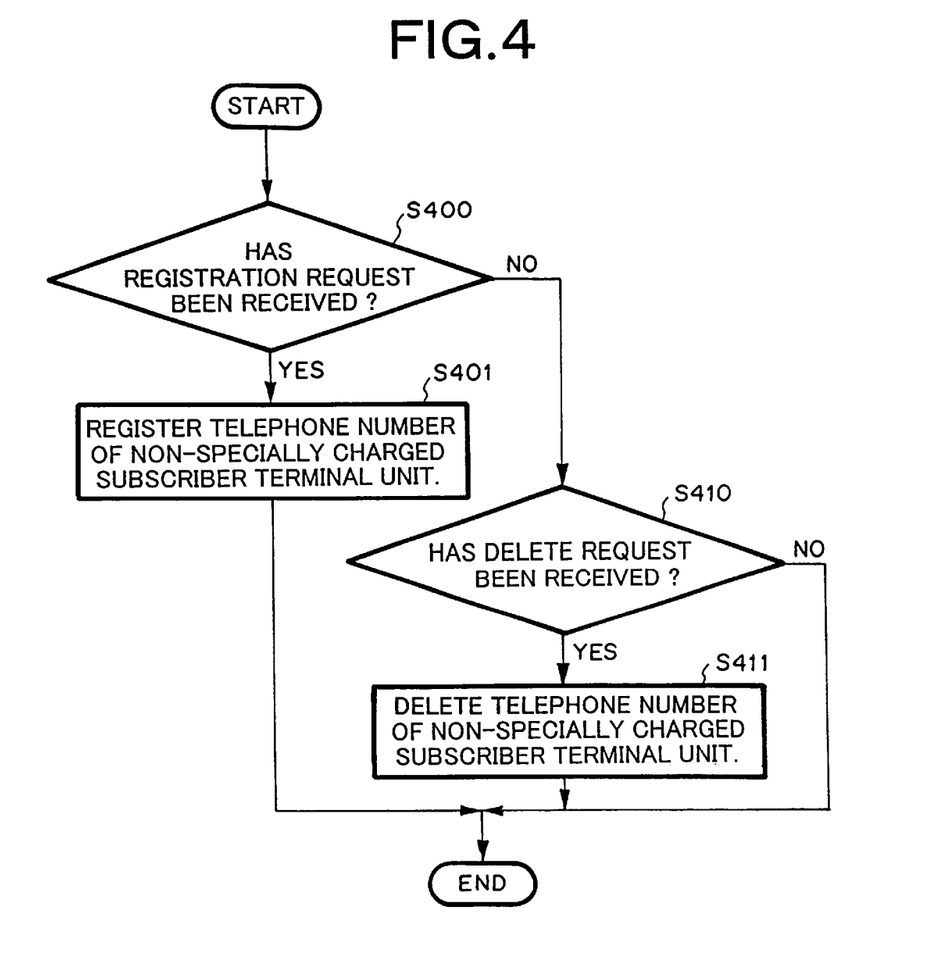
FIG. 4 is a flow chart for explaining a registration operation and a deletion operation for a non-specially charged subscriber.

Next, the registration operation and the deletion operation that are performed when a call is terminated, while a talk is being performed, or after a talk is over will be described. FIG. 4 is a flow chart for explaining the registration operation and the deletion operation that are performed when a call is terminated, while a talk is being performed, or after a talk is over.

When a call is terminated, while a talk is being performed, or after a talk is over, the call termination subscriber performs a predetermined button operation on the call termination subscriber terminal unit 20. When the call termination subscriber registers the telephone number, he or she dials for example #AA. When the call termination subscriber deletes the telephone number, he or she dials for example #DD. The exchange device 30 determines whether or not a registration request has been received (at step S400). When the exchange device 30 has received the registration request (namely, the determined result at step S400 is Yes), the exchange device 30 registers the telephone number of the call origination subscriber with the non-specially charged subscriber table (at step S401). At that point, since the exchange device 30 has recognized the telephone number of the call origination subscriber when the call had been terminated to the call termination subscriber terminal unit 20, the exchange device 30 does not need to prompt the call termination subscriber to input the telephone number of the call origination subscriber.

When the exchange device 30 has not received the registration request (namely, the determined result at step S400 is No), the exchange device 30 determines whether or not a deletion request has been received (at step S410). When the exchange device 30 has received the deletion request (namely, the determined result at step S410 is Yes), the exchange device 30 deletes the telephone number of the call origination subscriber from the non-specially charged subscriber table (at step S411).

Figure 5:
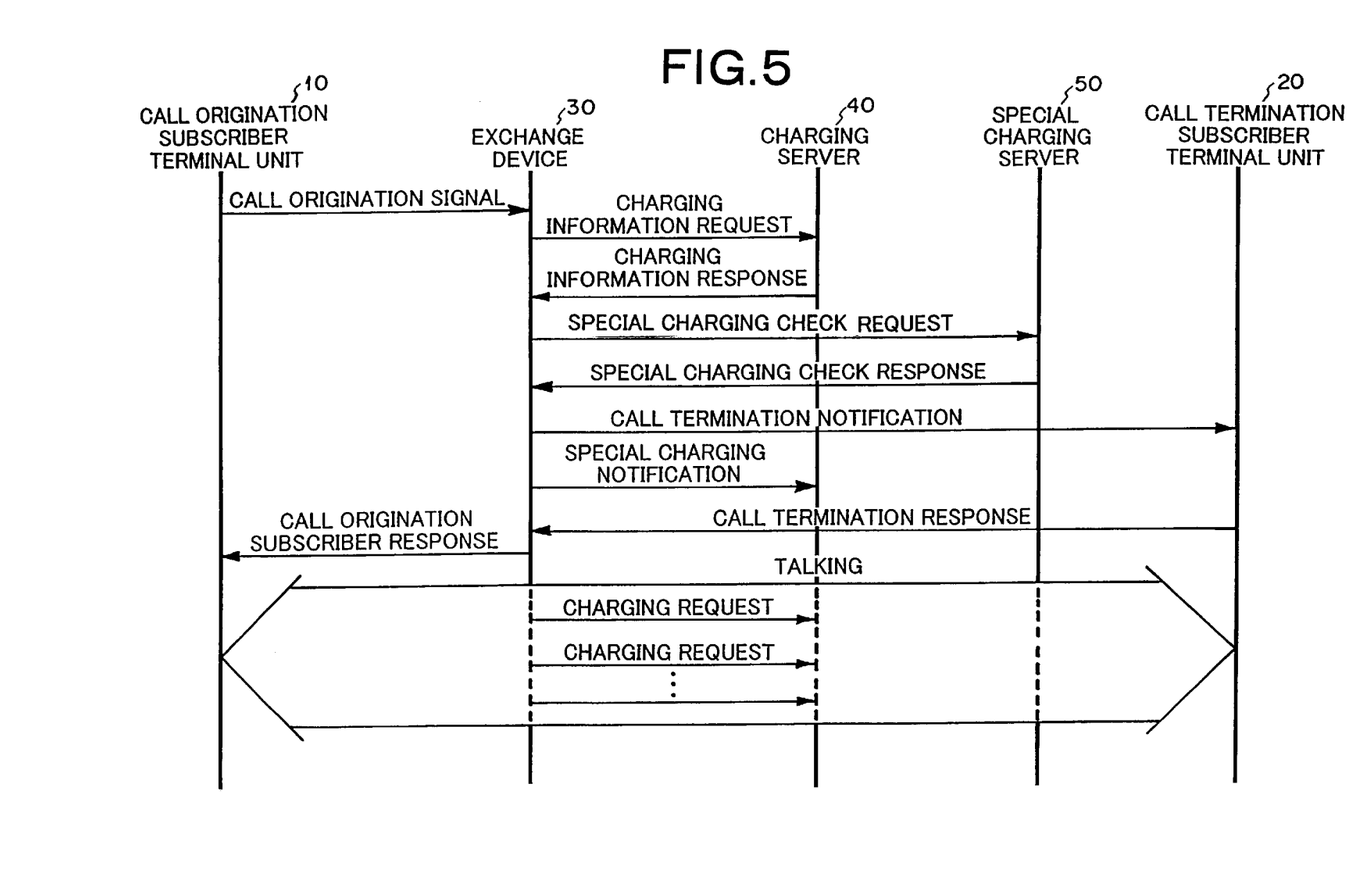
FIG. 5 is a sequence chart for explaining the operation of the call fee charging system shown in FIG. 1.

Next, the charging operation of the call fee charging system shown in FIG. 1 will be described. FIG. 5 is a sequence chart for explaining the charging operation of the call fee charging system according to the first embodiment of the present invention.

The call origination subscriber originates a call to the call termination subscriber terminal unit 20 with a predetermined dial operation or the like on the call origination subscriber terminal unit 10. At that point, the call origination subscriber terminal unit 10 sends a call origination signal to the exchange device 30. The call origination signal contains the telephone number of the call origination subscriber terminal unit 10 and the telephone number of the call termination subscriber terminal unit 20.

The exchange device 30 sends a charging information request to the charging server 40 so as to obtain information necessary for charging the call origination subscriber for the call. The charging information request contains the telephone number of the call origination subscriber terminal unit 10 and the telephone number of the call termination subscriber terminal unit 20. The information necessary for charging the call origination subscriber for the call is period (charging period) of a signal to be sent to the charging server 40.

The charging server 40 decides the charging period corresponding to the charging information request message. When the area code of the telephone number of the call origination subscriber terminal unit 10 is the same as the area code of the telephone number of the call termination subscriber terminal unit 20 and the local call fee is ¥10 every three minutes, the charging period is three minutes. The charging server 40 sends the telephone number of the call origination subscriber terminal unit 10 and the obtained charging period as a charging information response to the exchange device 30.

The exchange device 30 sends a special charging check request to the special charging server 50 so as to check whether or not the current call is a specially charged call. The special charging check request contains the telephone number of the call origination subscriber terminal unit 10 and the telephone number of the call termination subscriber terminal unit 20.

The special charging server 50 references the non-specially charged subscriber table to determine whether or not the call origination subscriber is a non-specially charged subscriber. In this example, it is assumed that the call origination subscriber is a specially charged subscriber. The special charging server 50 sends the determined result (representing that the call origination subscriber is a specially charged subscriber) as a special charging check response to the exchange device 30.

The exchange device 30 sends information representing that the current call is a specially charged call as a call termination notification to the call termination subscriber through the call termination subscriber terminal unit 20. The call termination notification contains the telephone number of the call origination subscriber terminal unit 10 and information representing that the current call is a specially charged call. An example of the message sent to the call termination subscriber is an audio guidance "You will get money in compensation for the call. . . . ". Alternatively, such a message may be displayed on the display panel of the call termination subscriber terminal unit 20.

The exchange device 30 sends information representing that the current call is a specially charged call as a special charging notification to the charging server 40. With the special charging notification, the charging server 40 recognizes that the current call is a specially charged call. When the special call fee is ¥30 every three minutes, the charging server 40 charges the call origination subscriber by ¥30 whenever the special charging notification message is received corresponding to the charging period.

The call termination subscriber receives the above-described call termination notification. At that time, the call termination subscriber performs a predetermined dial operation on the call termination subscriber terminal unit 20 to send a call termination response to the exchange device 30 through the call termination subscriber terminal unit 20.

The exchange device 30 sends information representing that the current call is a specially charged call as a call origination subscriber response to the call origination subscriber through the call origination subscriber terminal unit 10. An example of the call origination subscriber response message is an audio guidance "This call is a specially charged call. . . . ". Alternatively, the call origination subscriber response message may be displayed on the display panel of the call origination subscriber terminal unit 10. Thereafter, a talk is performed between the call origination subscriber terminal unit 10 and the call termination subscriber terminal unit 20.

While the talk is being performed, the exchange device 30 sends a charging request to the charging server 40 at the decided charging period. The charging request message contains the telephone number of the call origination subscriber. When the charging server 40 receives the charging request message, the charging server 40 charges the call origination subscriber for the specially charged call. Part or all of the margin between the special call fee and the regular call fee may be paid to the call termination subscriber. Thus, the call termination subscriber may get money for a specially charged call with the call origination subscriber. Alternatively, the telephone company or the like may collect a more expensive call fee than a regular call fee from the call origination subscriber for a specially charged call.

For example, when the regular call fee is ¥10 every three minutes and the special call fee is ¥30 every three minutes, the margin is ¥20. The margin may be equally shared by the telephone company (or the like) and the call termination subscriber. In this case, the payment for the specially charged call to the call termination subscriber may be a discount of the telephone fee billed at the end of the month or the like. Alternatively, the telephone company may directly pay the money for the specially charged call to the call termination subscriber.

Before starting to talk to the call origination subscriber, the call termination subscriber may check the telephone number of the call origination subscriber and request the exchange device 30 not to charge a special fee on the call. In addition, after starting to talk to the call origination subscriber, the call termination subscriber may check the telephone number of the call origination subscriber and request the exchange device 30 to cancel the special fee on the call. In the latter case, the call termination subscriber selects the start point of canceling the special fee from "at beginning of call" or "at the time of request for cancel". The specially charged call cancellation operation may be the same as the registration operation or deletion operation for the telephone number of the specially charged call.

As described above, according to the first embodiment of the present invention, the call termination subscriber can get money for a specially charged call. Specially, in the case of sales call, the call termination subscriber may get money (sales fee) for the sales call in compensation for his or her valuable time from the company providing the sales call. On the other hand, since the call termination subscriber gets money for listening to a sales call from the call termination subscriber, the call termination subscriber accepts to carefully listen to the sales talk. Thus, with specially charged calls, the call origination subscriber can more easily get customers than regularly charged calls. In other words, with specially charged calls, the call origination subscriber does not need to make many calls to people who tend to quickly disconnect.

In addition, a specially charged subscriber can be designated, and from a view of a call termination subscriber, unnecessary sales calls are easily excluded. This is because a call origination subscriber who is not registered as a non-specially charged subscriber tends to hold back from calling subscribers at the cost of special fee.

Since a specially charged subscriber can be designated, the call termination subscriber can easily refuse unnecessary sales calls. Since a call origination subscriber has not been designated as a non-specially charged subscriber, the call origination subscriber should pay a more expensive call fee than a regular call fee for a talk with a call termination subscriber. Thus, the call origination subscriber side tends to reduce calls to such call termination subscribers.

In addition, the call fee charging system according to the first embodiment of the present invention is effective to prevent spam calls. When a call origination subscriber who has not been designated as a nonspecially charged subscriber talks to a call termination subscriber, the call origination subscriber must pay such an extra call fee. Thus, when the call origination subscriber makes a spam call, he or she will immediately disconnect a call.

(Second Embodiment)

Figure 6:
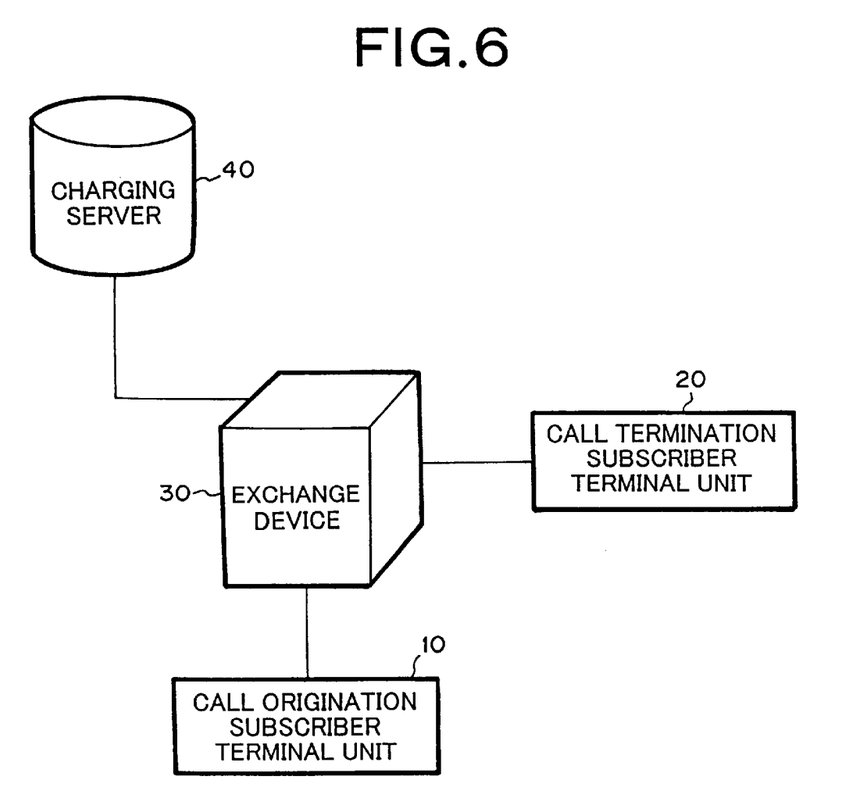
FIG. 6 is a block diagram for explaining a call fee charging system according to another embodiment of the present invention.

Next, a special call fee charging method according to another embodiment of the present invention will be described. FIG. 6 is a block diagram for explaining the structure of a call fee charging system according to a second embodiment of the present invention. In the call fee charging system shown in FIG. 6, the special charging server 50 is omitted from the call fee charging system shown in FIG. 1.

According to the first embodiment, a call termination subscriber designates the telephone number of a non-specially charged subscriber terminal unit. In contrast, according to the second embodiment, the call origination subscriber sends a notification representing that he or she is a specially charged subscriber to an exchange device 30. The notification may be sent when a call is originated or while a talk is being performed. First of all, the notification operation will be described.

In the case that the notification is sent when a call is originated, the call origination subscriber presses special buttons (for example, #GG). At that point, the exchange device 30 recognizes that the telephone number of the call origination subscriber terminal unit is a target of a special charge. This operation applies to the case that the notification is sent while a talk is being performed.

Figure 7:
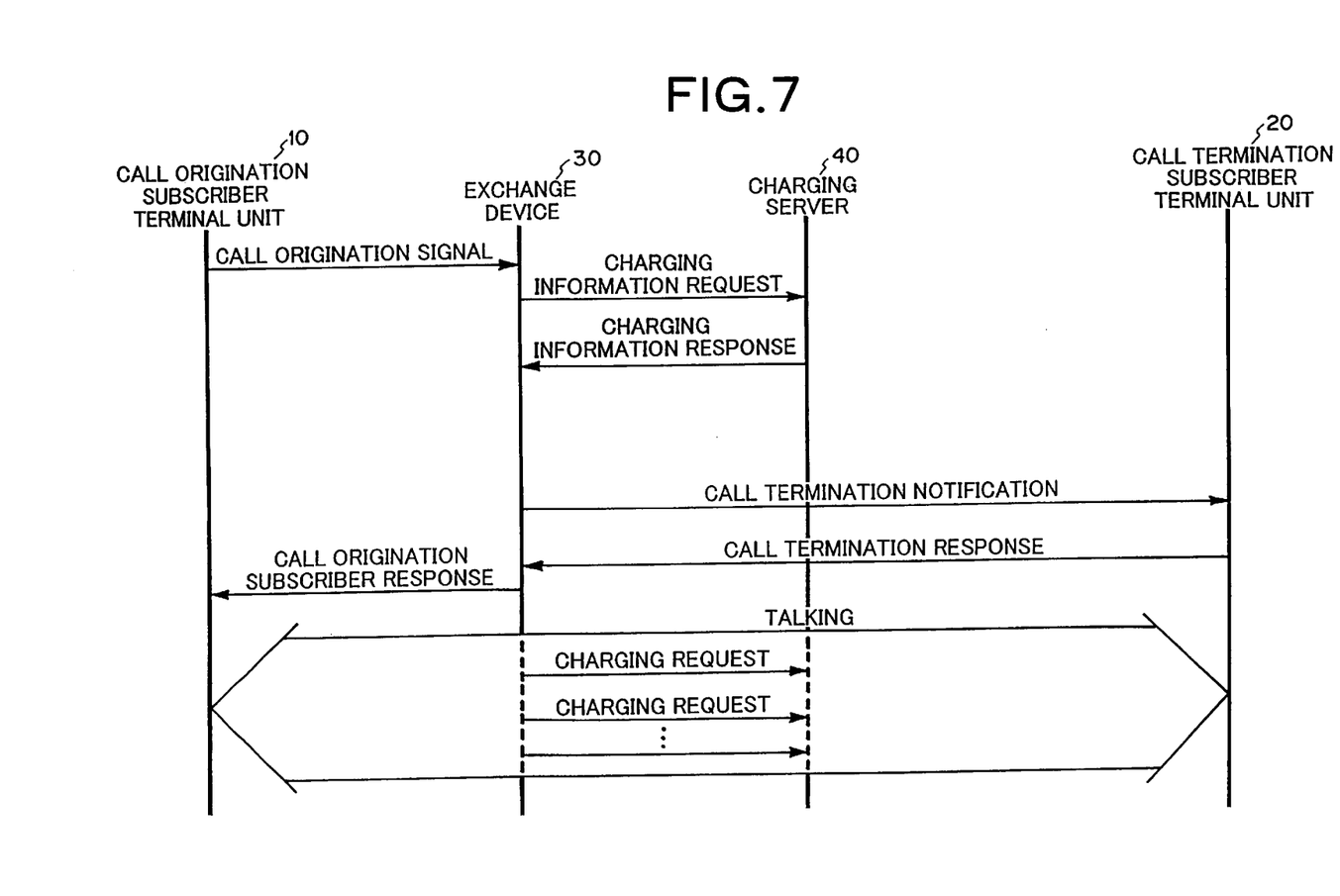
FIG. 7 is a sequence chart for explaining the operation of the call fee charging system shown in FIG. 6.

Next, the charging operation of the call fee charging system shown in FIG. 6 will be described. FIG. 7 is a sequence chart for explaining the operation of the call fee charging system according to the second embodiment of the present invention.

Like the first embodiment, a call origination subscriber terminal unit sends a call origination signal to the exchange device 30. At that point, the call origination signal contains the telephone number of the call origination subscriber terminal unit 10 and the telephone number of a call termination subscriber terminal unit 20.

The exchange device 30 sends a charging information request to the charging server 40 so as to obtain charging information (charging period). The charging information request message contains the telephone number of the call origination subscriber terminal unit 10, the telephone number of the call termination subscriber terminal unit 20, and information representing that the current call is a specially charged call. This is because the call origination subscriber terminal unit 10 has notified the exchange device 30 that the current call is a specially charged call.

When a charging server 40 receives the charging information request, the charging server 40 recognizes that the current call is a specially charged call and decides a charging period. Thereafter, the charging server 40 sends the decided charging period to the exchange device 30. In this case, like the first embodiment, the charging server 40 designates a charging period so that the special call fee is ¥30 every three minutes in contrast to that the regular call fee is ¥10 every three minutes. In this case, the charging server 40 sends a charging information response that represents that the charging period is three minutes to the exchange device 30.

Like the first embodiment, the exchange device 30 sends a call termination notification to the call termination subscriber terminal unit 20. At that point, the call termination notification contains information that represents that the current call is a specially charged call. Thereafter, the same operation as the first embodiment is performed.

As described above, according to the second embodiment, since the exchange device 30 can recognize that the current call is a specially charged call with the notification message received from the call origination subscriber terminal unit 10, the special charging server 50 that determines whether or not the current call is a specially charged call can be omitted. Thus, the fabrication cost can be reduced.

According to the present invention, when the current call is a specially charged call, the charging means collects a special call fee from the call origination subscriber and pays part or all of the margin between the special call fee and the regular call fee to the call termination subscriber. Thus, the call termination subscriber can get money for the call from the call origination subscriber. Alternatively, the telephone company or the like can collect a more expensive call fee from the call origination subscriber than a regular call fee.

In particular, the call termination subscriber may get money for a sales call in compensation for his or her valuable time. On the other hand, since the call origination subscriber pays money for a sales call to the call termination subscriber, the call origination subscriber can request the call termination subscriber to carefully listen to the sales talk. Thus, with specially charged calls, the call origination subscriber can more easily get customers than regularly charged calls. In other words, with specially charged calls, the call origination subscriber does not need to make many calls to people who tend to quickly disconnect. Thus, both the customer (call termination subscriber) and the sales side will have large advantages with the present invention.

In addition, since the exchange device can recognize that the current call is a specially charged call with a notification received from the call origination subscriber terminal unit, the structure of the conventional call fee charging system can be used. By changing only a desired function (control program), the present invention can be accomplished. Thus, the fabrication cost can be reduced.

Although the present invention has been shown and described with respect to the best mode embodiment thereof, it should be understood by those skilled in the art that the foregoing and various other changes, omissions, and additions in the form and detail thereof may be made therein without departing from the spirit and scope of the present invention.

What is claimed is:

1. A special call fee charging method, comprising the steps of:

causing an exchange device to receive a call origination signal from a call origination subscriber terminal unit;

causing the exchange device to inquire of a special charging server whether or not the call origination subscriber terminal unit is a specially charged subscriber terminal unit;

causing the special charging server to reply to the exchange device whether or not the call origination subscriber terminal unit is a specially charged subscriber terminal unit;

if the call origination terminal unit is a specially charged call terminal unit, causing the exchange device to notify a general charging server that the call origination subscriber terminal unit is charged a special call fee;

causing the exchange device to inquire of the special charging server about a charging period;

causing the special charging server to notify the exchange device of the charging period; and causing the exchange device to send a charging request to the general charging server whenever the charging period elapses in a talk.

2. The special call fee charging method as set forth in claim 1, further comprising the step of:

causing the special charging server to register a telephone number of a subscriber terminal unit as a non-specially charged subscriber terminal unit with a table, wherein if the telephone number of the call origination subscriber terminal unit has not been registered with the table, the special charging server determines that the call origination subscriber terminal unit is a specially charged subscriber terminal unit.

3. The special call fee charging method as set forth in claim 1, further comprising the step of:

paying a part or all of the margin between the special call fee and a regular call fee to a call receiver.

4. A special call fee charging method, comprising the steps of:

causing an exchange device to receive a call origination signal from a call origination subscriber terminal unit, the call origination signal containing a special charging request;

causing the exchange device to notify a charging server that the call origination subscriber terminal unit is charged a special call fee;

causing the exchange device to inquire of the charging server about a charging period;

causing the charging server to notify the exchange device of the charging period; and causing the exchange device to send a charging request to the charging server whenever the charging period elapses in a talk.

5. The special call fee charging method as set forth in claim 4, further comprising the step of:

paying a part or all of the margin between the special call fee and a regular call fee to a call receiver.

* * * * *